United States Patent [19]

Kanayama et al.

[11] Patent Number: 5,582,341
[45] Date of Patent: Dec. 10, 1996

[54] BONDING APPARATUS FOR TERMINAL COMPONENT

[75] Inventors: Shinji Kanayama, Kashihara; Akira Kabeshita, Hirakata; Satoshi Ohnakada, Toyonaka; Kenichi Nishino, Osaka; Nobuhiko Muraoka, Toyonaka, all of Japan

[73] Assignee: Matsushita Electric Industrial Co., Ltd., Osaka-fu, Japan

[21] Appl. No.: 496,691

[22] Filed: Jun. 29, 1995

[30]  Foreign Application Priority Data

Jun. 30, 1994  [JP]  Japan .................................. 6-149928

[51] Int. Cl.$^6$ ............................. B23K 37/04; B23K 20/02
[52] U.S. Cl. ............................. 228/5.5; 228/6.2; 228/44.7
[58] Field of Search .................................. 228/5.5, 44.7, 228/106, 6.2

[56]  References Cited

U.S. PATENT DOCUMENTS 4,657,170   4/1987   Müller ..................................... 228/5.5
4,913,336   4/1990   Yamazaki ............................... 228/5.5

OTHER PUBLICATIONS

B. Z. Hairabedian, "Resilient Ribbon Batch Soldering," *IBM Tech. Discl. Bull.*, vol. 15., No. 6, Nov. 1972, p. 1854.

Primary Examiner—Samuel M. Heinrich
Assistant Examiner—Jeffrey T. Knapp
Attorney, Agent, or Firm—Wenderoth, Lind & Ponack

[57]  ABSTRACT

A terminal component bonding apparatus is provided that has a stage for supporting a board having terminal components thereon, supporting the board. A pressure tool with a heater is set in a movable manner in a vertical direction above the stage so as to bond the terminal components to the board with heat and pressure. A shockless sheet is disposed along a lower surface of the pressure tool, and a pressing plate for terminal components is arranged along a lower surface of the shockless sheet and is made of a plate of a thermal expansion coefficient lower than that of the shockless sheet.

4 Claims, 2 Drawing Sheets

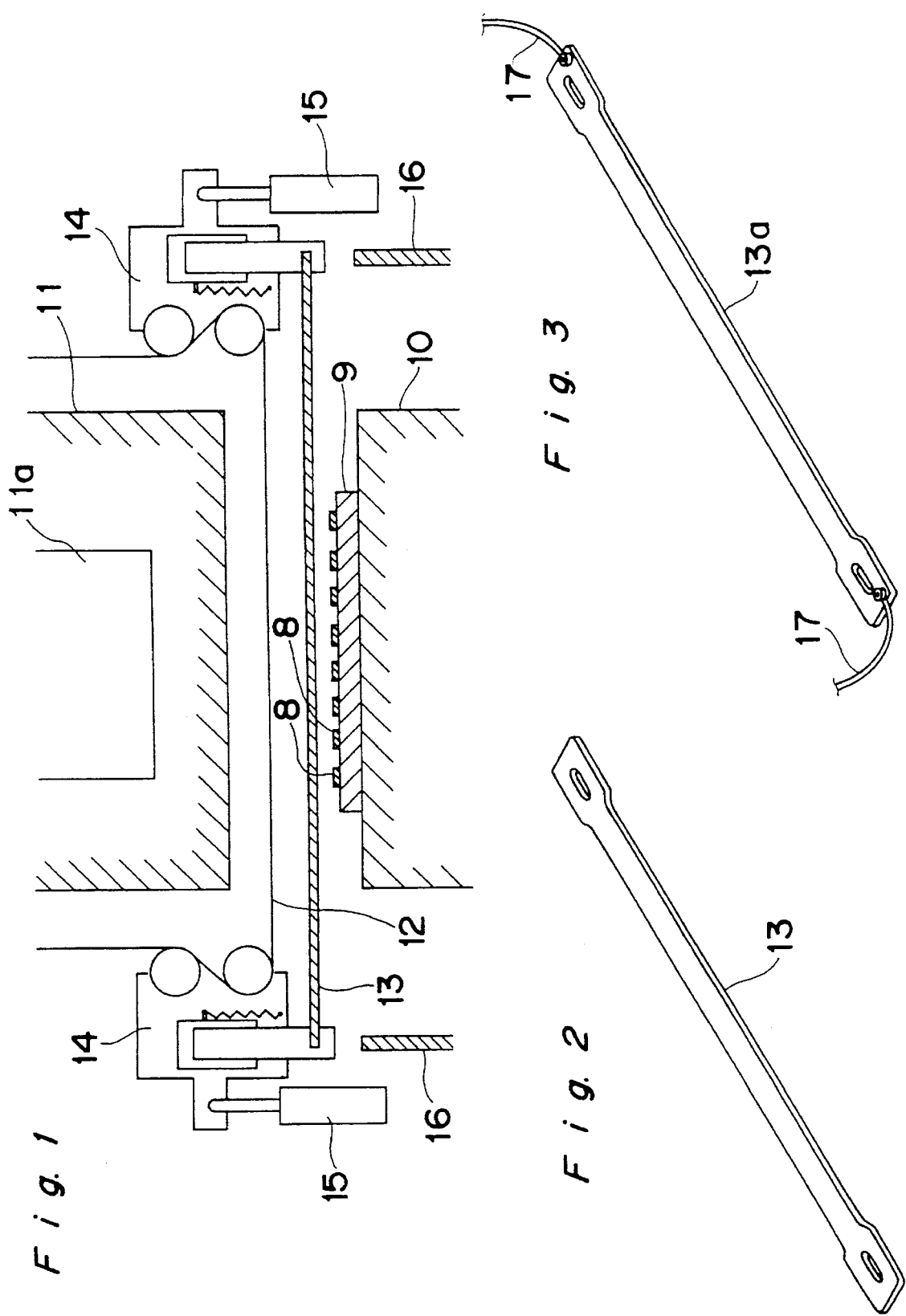

BONDING APPARATUS FOR TERMINAL COMPONENT

BACKGROUND OF THE INVENTION

The present invention relates to an apparatus for bonding terminal components with heat and pressure to a board forming a front plate or back plate of a liquid crystal display device or a flat display device such as a plasma display panel (PDP), etc. during the manufacture of the device.

In forming a front plate or back plate of a flat display device to use of a terminal component bonding apparatus in the prior art, as shown in FIG. 4, a glass board 2 with loading many terminal components 1 loaded thereon as lead terminals is set on a stage 3. A shockless sheet 4 of silicone rubber disposed above the stage 3 is lowered by cylinders 5 and driving mechanisms 6. A pressure tool 7 arranged over the shockless sheet 4 in a vertically movable fashion follows the shockless sheet 4. The pressure tool 7 has a cartridge heater built therein. When the pressure tool 7 heated at a predetermined temperature by this heater presses down the terminal components 1 via the shockless sheet 4 for a predetermined time, the terminal components 1 are bonded to electrode terminals of the board 2.

However, the above bonding tends to cause a positional shift of the terminal components 1 even when the terminal components 1 have been aligned accurately over the electrode terminals of the board 2 beforehand. While the shockless sheet 4 is useful to add a uniform pressure and a uniform heat to the many terminal components 1, the shockless sheet 4 shows not a little expansion when heated and pressured by the pressure tool 7, consequently resulting in the aforementioned positional shift of the terminal components 1.

SUMMARY OF THE INVENTION

The object of the present invention is therefore to provide a terminal component bonding apparatus capable of bonding terminal components with heat and pressure at a predetermined position on a board accurately.

In accomplishing these and other objects, according to one aspect of the present invention, there will be provided a terminal component bonding apparatus which is provided with:

a stage for supporting a board having terminal components loaded thereon, at a lower surface of the board;

a pressure tool with a heater which is set in a movable manner in a vertical direction above the stage so as to bond the terminal components to the board with heat and pressure;

a shockless sheet disposed along a lower surface of the pressure tool; and a pressing plate for terminal components which is arranged along a lower surface of the shockless sheet and which is made of a plate having a thermal expansion coefficient lower than that of the shockless sheet, the plate being capable of bending in accordance with a pressure applied by the pressure tool via the shockless sheet.

BRIEF DESCRIPTION OF THE DRAWINGS

These and other objects and features of the present invention will become clear from the following description taken in conjunction with the preferred embodiments thereof and with reference to the accompanying drawings, in which:

FIG. 1 is a side sectional view showing the structure of a terminal component bonding apparatus in one embodiment of the present invention;

FIG. 2 is a perspective view of a terminal component pressing plate of the apparatus of FIG. 1;

FIG. 3 is a perspective view of a terminal component pressing plate in a different embodiment of the present invention.

DETAILED DESCRIPTION OF THE PREFERRED EMBODIMENTS

Figure 4:
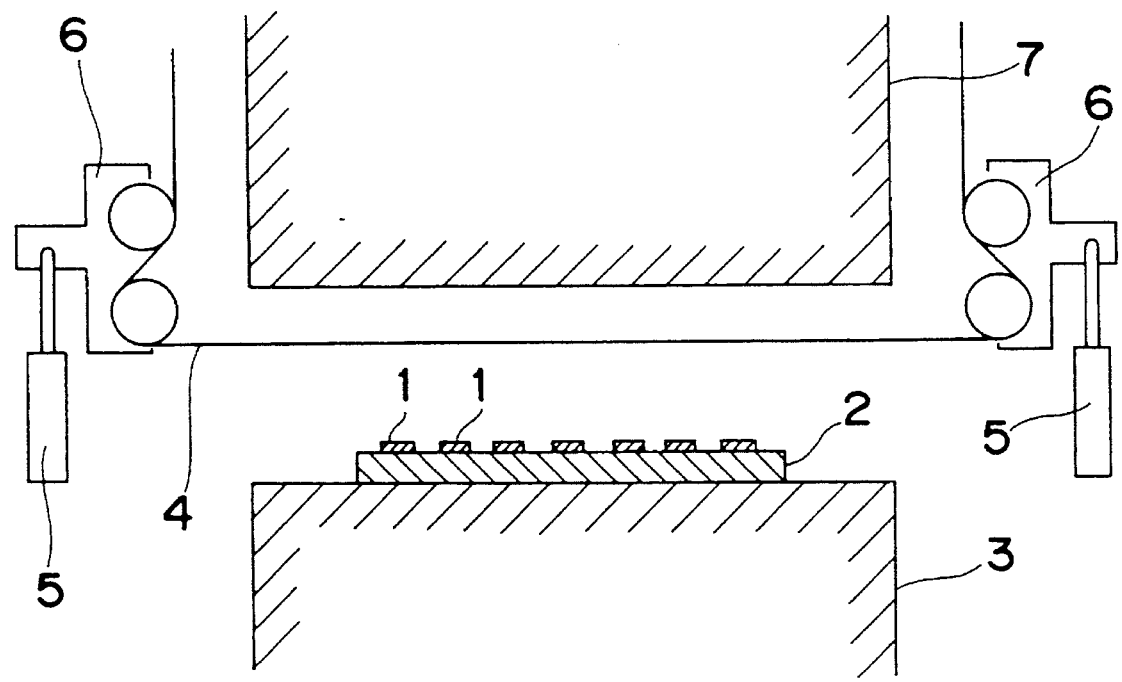
FIG. 4 is a side sectional view showing the structure of a conventional terminal component bonding apparatus.

Before the description of the present invention proceeds, it is to be noted that like parts are designated by like reference numerals throughout the accompanying drawings.

The present invention will be described taken in conjunction with preferred embodiments thereof with reference to the accompanying drawings.

As indicated in FIG. 1, a glass board 9 with many terminal components 8 is set on a stage 10 for receiving the board 9 thereon. A pressure tool 11 for thermally bonding the terminal components 8 to electrode terminals of the board 9 is disposed above the stage 10 in a movable manner in the vertical direction in FIG. 1. A cartridge heater 11a is built in the pressure tool 11 to heat to a predetermined temperature. A tape-like shockless (cushioning) sheet 12 mainly composed of silicone rubber is arranged along the lower surface of the pressure tool 11.

A pressing plate 13 of a metallic thin plate of a low thermal expansion coefficient, for example, $3 \times 10^{-6}/C°$ or less, lies parallel to the lower surface of the shockless sheet 12. The thickness of the pressing plate 13 is, for example, approximately 0.5 mm. It is preferable that the pressing plate 13 is capable of bending. Driving cylinders 15 are coupled to a pair of supporting mechanisms 14 supporting the shockless sheet 12 and the pressing plate 13. Stoppers 16 below the respective supporting mechanisms 14 regulate the lowest position when the pressing plate 13 moves up and down. Such a lowest position may be defined as a position where it can ensure that a suitable pressure for pressing the terminal components against the board is surely applied to the components 8 via the shockless sheet 12 and the pressing plate 13 but prevent the pressing plate 13 from giving an excessive amount of pressure to the components 8.

The pressing plate 13 of the embodiment is made of approximately 0.5 mm thick invar in a band-like shape as represented in FIG. 2.

When the cylinders 15 drive the supporting mechanisms 14 in the state of FIG. 1, the pressing plate 13 and the shockless sheet 12 supported by the supporting mechanisms 14 are lowered and sequentially laid over the terminal components 8. Then, in accordance with the downward movement of the pressure tool 11 ready for heating, the energy of pressure and heat is transmitted to the terminal components 8 via the shockless sheet 12 and the pressing plate 13, whereby the components 8 are thermally bonded to the board 9. At this time, the shockless sheet 12 expands along the surface of the pressing plate 13, which however is sensed only on the upper surface of the pressing plate 13 and not spread to the lower surface of the pressing plate 13.

The terminal components 8 are connected to ends of many linear electrodes provided on one surface of the glass board 9, serving as tabs constituting lead terminals of the electrodes, and aligned along one side of the board 9. The pressing plate 13 is accordingly sufficient if it is a band-like plate. The thermal capacity of the band-like pressing plate 13 is relatively small, that is, smaller than that of the pressure tool 11, and therefore superior in rapid-heating and rapid-cooling properties with little adverse influences attended in the thermal history.

A pressing plate 13a in a different embodiment shown in FIG. 3 is formed of metal of a high resistance, e.g., an alloy of nickel and chromium, or stainless steel. The high resistance means $10^{-6}\Omega cm$ or more. The band-shaped pressing plate 13a is approximately 0.5 mm thick and has heat conduction terminals 17 at both ends thereof. When a heating current is supplied between the terminals 17, the pressing plate 13a itself generates heat. Therefore, the temperature at the bonding part of the pressing plate 13a is not lowered in spite of the intervention of the pressing plate 13a between the shockless sheet 12 and many terminal components 8. Moreover, the amount of heat to be fed to the pressure tool 11 can be reduced.

As described hereinabove, the pressing plate disposed between the shockless sheet and terminal components avoids the spread of the expansion of the shockless sheet to the terminal components even though the shockless sheet expands during the heat bonding, so that the terminal components can be thermally bonded at a predetermined position on the board accurately.

In the apparatus according to the present invention, the pressing plate of a thermal expansion coefficient lower than that of the shockless sheet is interposed between the shockless sheet and the terminal components to retain the terminal components, thereby prohibiting the terminal components from being in direct touch with the shockless sheet. In other words, even if the shockless sheet expands, the terminal components never follow the expansion and never shift.

The pressing plate not only transmits the energy of the pressure and heat fed via the shockless sheet to the terminal components, but acts to buffer the terminal components together with the shockless sheet. Since the pressing plate itself expands little with heat, it can press and heat many terminal components uniformly without disturbing the alignment of the terminal components.

In addition, the pressing plate can be formed of a band of metal of a high resistance and heat conduction terminals are provided at both ends of the band-shaped pressing plate. The heat conduction terminals generate heat when electricity is supplied to the pressing plate, so that the temperature at the bonding part is prevented from being decreased. Moreover, the amount of heat to the pressure tool is reduced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A terminal component bonding apparatus which is provided with:

a stage for supporting a board having terminal components thereon;

a pressure tool with a heater, wherein the pressure tool is set in a movable manner in a vertical direction above the stage so as to bond the terminal components to the board with heat and pressure;

a shockless sheet disposed along a lower surface of the pressure tool; and a pressing plate for pressing the terminal components, wherein the pressure plate is arranged along a lower surface of the shockless sheet and is made of a plate having a thermal expansion coefficient lower than that of the shockless sheet, the plate being capable of bending in accordance with a pressure applied by the pressure tool via the shockless sheet.

2. The terminal component bonding apparatus according to claim 1, wherein the pressing plate has a thermal expansion coefficient which is lower than that of the shockless sheet and is $3\times10^{-6}/C°$ or less.

3. The terminal component bonding apparatus according to claim 1, wherein the pressing plate is a electrical band-shaped metallic body having a resistance of $10^{-6}\Omega cm$ or more and heat conduction terminals at both ends thereof so as to cause the pressing plate to generate heat.

4. The terminal component bonding apparatus according to claim 3, wherein a thermal capacity of the pressing plate is smaller than that of the pressure tool.

\* \* \* \* \*